(12) United States Patent
Mendoza et al.

(10) Patent No.: US 7,768,932 B2
(45) Date of Patent: Aug. 3, 2010

(54) METHOD FOR ANALYZING A SYSTEM IN A NETWORK

(75) Inventors: Vince Mendoza, Rocklin, CA (US);
Mark Tassinari, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1158 days.

(21) Appl. No.: 11/105,042

(22) Filed: Apr. 13, 2005

(65) Prior Publication Data

US 2006/0233113 A1    Oct. 19, 2006

(51) Int. Cl.
*H04L 12/28* (2006.01)

(52) U.S. Cl. .................... 370/252; 702/185

(58) Field of Classification Search .............. 709/220, 709/223, 204; 370/256, 432, 474, 230, 255, 370/338, 419, 313, 469, 351, 385; 707/3
See application file for complete search history.

(56) References Cited

U.S. PATENT DOCUMENTS

| | | | | |
|---|---|---|---|---|
| 5,694,591 A * | 12/1997 | Du et al. | | 707/2 |
| 5,872,773 A * | 2/1999 | Katzela et al. | | 370/256 |
| 5,940,771 A * | 8/1999 | Gollnick et al. | | 455/517 |
| 6,172,990 B1 * | 1/2001 | Deb et al. | | 370/474 |
| 6,262,977 B1 * | 7/2001 | Seaman et al. | | 370/256 |
| 6,333,931 B1 * | 12/2001 | LaPier et al. | | 370/385 |
| 6,411,616 B1 * | 6/2002 | Donahue et al. | | 370/352 |
| 6,424,659 B2 * | 7/2002 | Viswanadham et al. | | 370/469 |
| 6,535,491 B2 * | 3/2003 | Gai et al. | | 370/256 |
| 6,633,878 B1 * | 10/2003 | Underwood | | 707/100 |
| 6,697,349 B2 * | 2/2004 | Mathis et al. | | 370/338 |
| 6,704,933 B1 * | 3/2004 | Tanaka et al. | | 725/132 |
| 6,826,158 B2 * | 11/2004 | Seaman et al. | | 370/254 |
| 6,950,853 B2 * | 9/2005 | Garcia-Luna-Aceves et al. | | 709/204 |
| 6,982,960 B2 * | 1/2006 | Lee et al. | | 370/254 |
| 7,010,622 B1 * | 3/2006 | Bauer et al. | | 709/252 |
| 7,020,697 B1 * | 3/2006 | Goodman et al. | | 709/223 |
| 7,020,875 B2 * | 3/2006 | Zweifel et al. | | 717/168 |
| 7,103,647 B2 * | 9/2006 | Aziz | | 709/220 |
| 7,339,903 B2 * | 3/2008 | O'Neill | | 370/313 |
| 7,342,897 B1 * | 3/2008 | Nader et al. | | 370/255 |
| 7,379,429 B1 * | 5/2008 | Thottakkara | | 370/256 |
| 2003/0023518 A1 * | 1/2003 | Spriggs et al. | | 705/28 |
| 2003/0083837 A1 * | 5/2003 | Dinning et al. | | 702/117 |
| 2003/0084135 A1 * | 5/2003 | Narain | | 709/223 |
| 2004/0179524 A1 * | 9/2004 | Sasagawa et al. | | 370/389 |
| 2005/0222815 A1 * | 10/2005 | Tolly | | 702/185 |
| 2005/0237943 A1 * | 10/2005 | Sasagawa | | 370/242 |
| 2006/0085404 A1 * | 4/2006 | Kusunoki | | 707/3 |
| 2006/0146857 A1 * | 7/2006 | Naik et al. | | 370/432 |
| 2006/0164984 A1 * | 7/2006 | Rao et al. | | 370/230 |
| 2006/0198323 A1 * | 9/2006 | Finn | | 370/256 |
| 2006/0198359 A1 * | 9/2006 | Fok et al. | | 370/351 |
| 2006/0217152 A1 * | 9/2006 | Fok et al. | | 455/557 |
| 2006/0227797 A1 * | 10/2006 | Chandika et al. | | 370/419 |

* cited by examiner

*Primary Examiner*—Thong H Vu (57) ABSTRACT

A method for analyzing a system having a known function in a network includes issuing instructions from the outside the system to modify the configuration of the system, and then issuing a command to the modified system to perform the known system function. Data resulting from performing the known system function in the modified system is collected for analysis.

22 Claims, 6 Drawing Sheets

METHOD FOR ANALYZING A SYSTEM IN A NETWORK

FIELD OF INVENTION

The present invention relates to network test methods, and in particular to active network test or analysis methods in which a system of the network is externally stimulated with predefined operational conditions for modifying the configuration of the system.

BACKGROUND OF THE INVENTION

Known methods for measuring the health of a network typically focuses on hardware performance, data rates, link errors and data packet loss, for example. These methods neglect to analyze the responsiveness of critical, high level system functions, e.g., the software running on the network devices. Degradation in performance of software can impact network performance as readily as hardware switching failures, for example. The incomplete data provided by known analysis tools does not permit a full analysis of the health of the devices or system under test, leaving too much room for judgment errors. Moreover, tests that are currently in use employ passive observations of network systems. In other words, the network systems are monitored or analyzed in the course of their normal operation, or controlled to operate under normal conditions. This does not provide a complete picture of the system in situations that are abnormal.

SUMMARY OF THE INVENTION

The present invention is direct to a method and apparatus for analyzing a system having a known function in a network. The method includes issuing instructions from outside the system to modify the configuration of the system, and then issuing a command to the modified system to perform the known system function. Data resulting from performing the known system function in the modified system is collected for analysis.

DETAILED DESCRIPTION OF THE INVENTION

Figure 1:
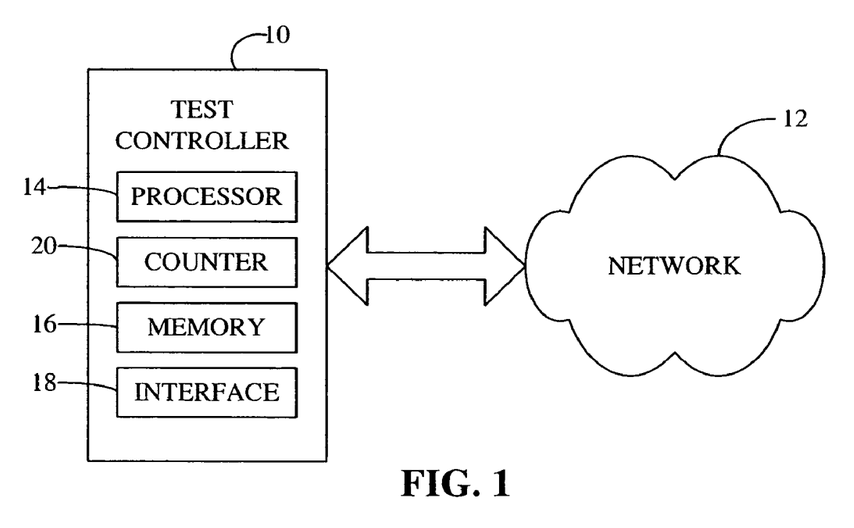
FIG. 1 is a diagram showing a test controller in accordance with one embodiment of the present invention.

Turning now to FIG. 1, the present invention includes a test controller 10 which is adapted and configured to be in communication with a network 12 such as a local area network (LAN) or a wide area network (WAN) or the Internet. The test controller 10 may be a user device such as a PC, a network administrator in the form of a server or an agent embedded in the software that controls a switch or router. The test controller 10 includes a processor 14 for executing a number of predefined test programs that are stored in a memory 16 for performing various analyses. The memory 16 also stores any data collected from executing test programs. An interface 18 enables communication between the test controller 10 and the network 12. The test controller 10 also includes a counter 20 which functions as a timer for keeping track of elapsed time that may be necessary in analyzing the system under test.

Figure 2:
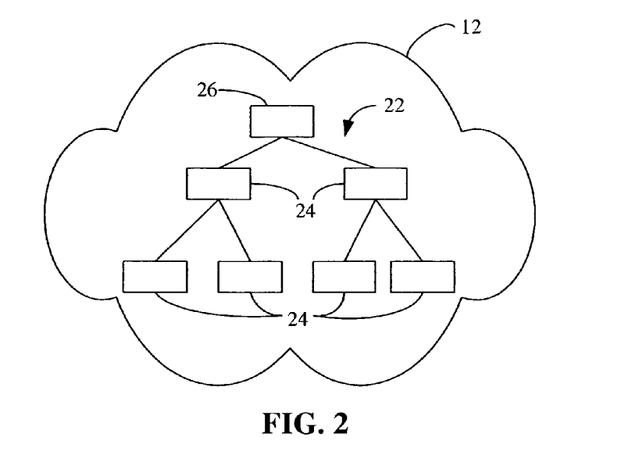
FIG. 2 is a diagram illustrating an example of a system in the network having a spanning tree configuration.

One analysis, in accordance with one embodiment of the present invention, involves forcing a spanning tree to change its root and analyzing data resulting from the calculation of the network 12 in rediscovering and rebuilding a new spanning tree topology based on a newly defined root. As is known in the art, a spanning tree is created by a spanning tree protocol that provides path redundancy between network devices while preventing unacceptable loops in the network 12. FIG. 2 shows an example of a spanning tree 22 in the network 12, which includes a number of network devices 24 including one network device which is the root 26 of the spanning tree 22.

Figure 3:
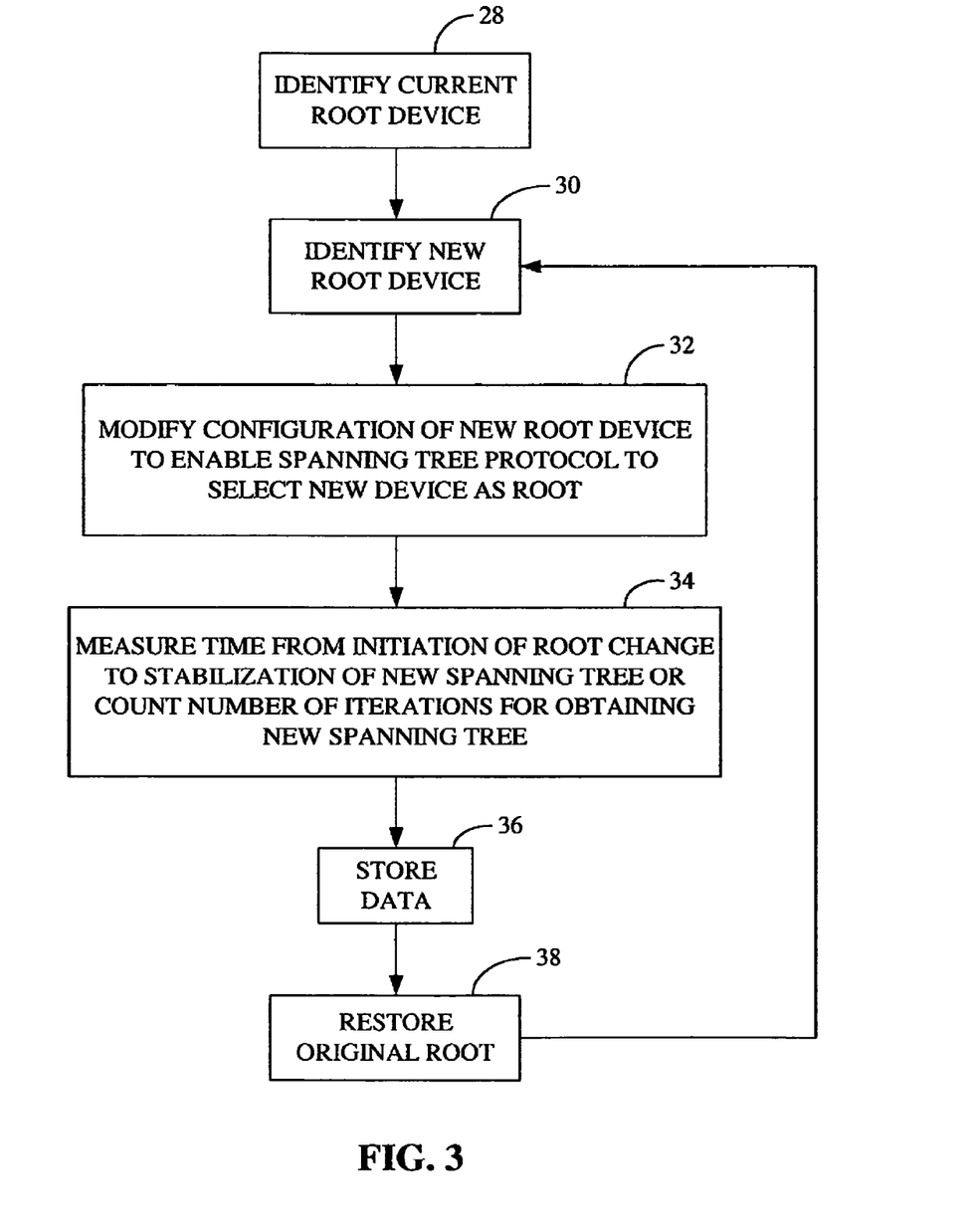
FIG. 3 is a flowchart describing a method for analyzing a system having a spanning tree configuration in accordance with one embodiment of the present invention.

The processor 14 of the test controller 10 shown in FIG. 1 carries out the operation shown in FIG. 3 and identifies the root device 26 in the existing spanning tree 22, which has been previously created through a spanning tree protocol (block 28). The root device 26 can be identified by querying any of the network devices 24 in the spanning tree 22 using a network protocol such as SNMP. Any of the network devices 24 is capable of identifying the root device 26.

Once the root device 26 has been identified, a new root device is selected from among the network devices 24 in the spanning tree 22 (block 30). The new root device, for example, may be a network device 24 near the original root device 26 and somewhere central in the network 12. However, any other network devices 24 in the spanning tree 22 may be selected. It should be noted, however, that the new root device should be selected based on a foreseeable amount of recalculation that the system may undergo in order to reconfigure the spanning tree 22 into a new topology based on the newly selected root device.

Figure 4:
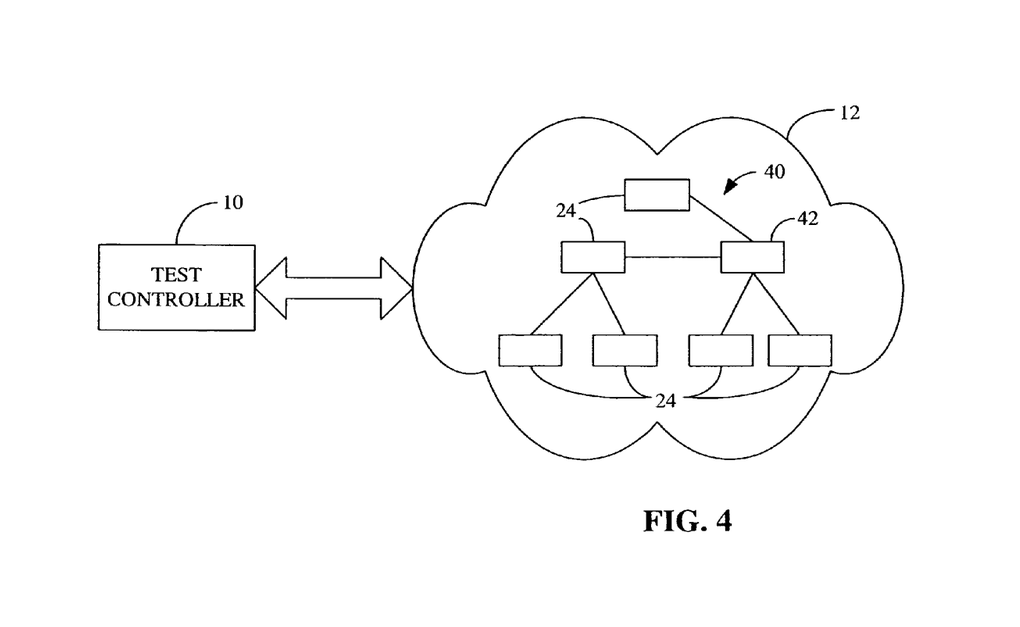
FIG. 4 is a diagram illustrating a change in the configuration of the system shown in FIG. 2 as a result of implementing the method described in FIG. 3.

Once the new root device has been identified, it is configured so that a spanning tree protocol will recognize it to be the root (block 32). In this manner, the spanning tree protocol is forced to notify all the network devices 24 in the spanning tree 22 that a new root has been determined, and reconfigure each of the network devices 24 in the spanning tree to recalculate or reconfigure the spanning tree based on the newly selected root device. An example of a new spanning tree 40 configured based on a newly selected root device 42 is shown in FIG. 4.

Once the spanning tree protocol has been employed to initiate the topology change of the spanning tree 22, the counter 20 measures the amount of time that has elapsed from the initiation of the root change to the time the topology of the new spanning tree 40 stabilizes (block 34). In addition to, or alternatively, the counter 20 may count the number of times the spanning tree 22 has to recalculate to form the new spanning tree topology 40.

The process for creating a spanning tree typically includes selecting a topology and then receiving information (i.e., notification from new devices each declaring themselves as a root) from the network devices 24 and reprocessing the information (i.e., evaluating the advertised root priority from each neighboring device and setting its root path to whichever has the higher priority) to attempt to create the new topology, which may or may not be successful. This process is carried out iteratively until new information is no longer received and the new topology has been created.

The information obtained above (in block 34) relating to the formation the new spanning tree topology 40 is stored in the memory 16 (block 36). The original root device 26 may be restored (block 38) and the original spanning tree 22 may be modified again for making repeated measurements described above at a different time (block 30). The information stored in the memory 16 is reviewed by an analyst for determining the health of the system.

Figure 5:
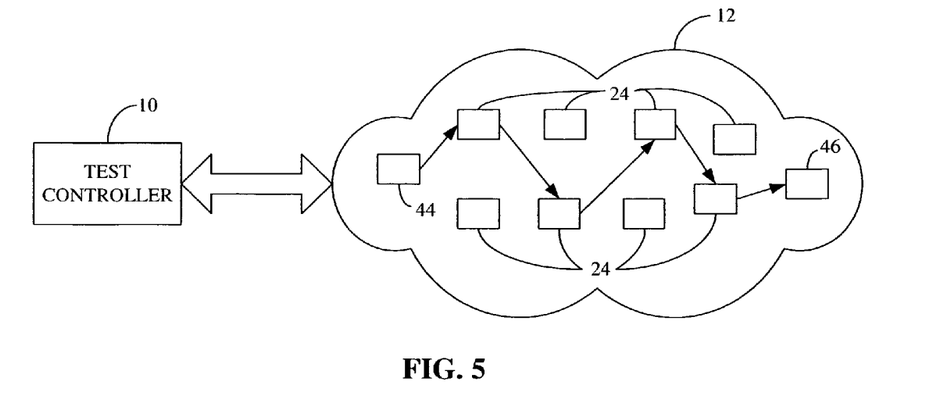
FIG. 5 is a diagram illustrating a system modified to analyze a routing path of the system.

Another analysis in accordance with the present invention involves establishing a predefined path between a number of network devices 24 in the network 12, measuring the time that it takes for network device instructions for moving data packets across the network to propagate from point A to point B and also the amount of time that an actual data packet arrives at the destination. As illustrated in FIG. 5, the path (shown by arrows) between a starting node 44 to a receiving node 46 is predefined by the processor 14 of the test controller 10, so that information or data packets are transmitted through this path.

Figure 6:
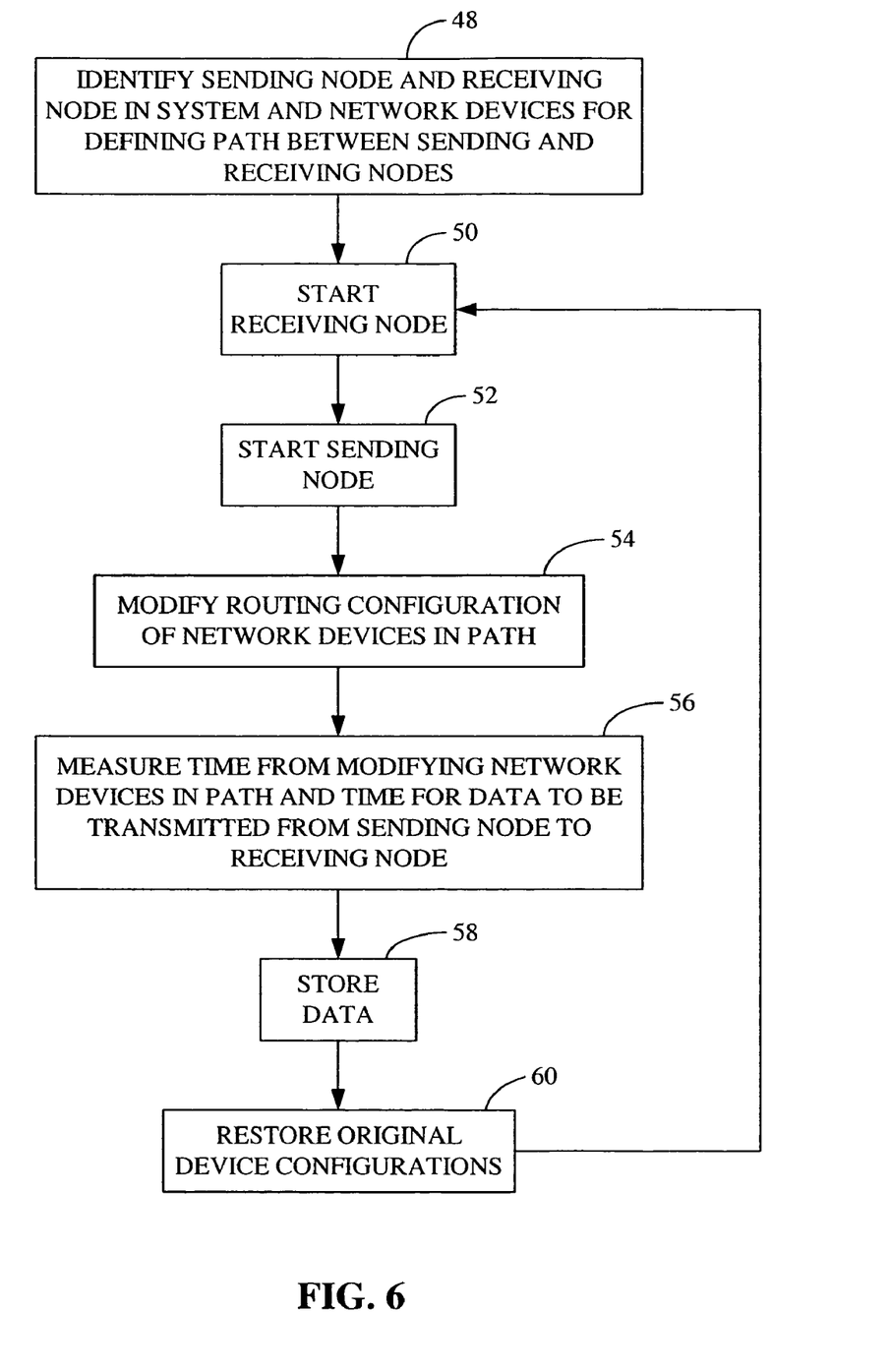
FIG. 6 is a flowchart describing the process for conducting the routing path analysis in accordance with one embodiment of the present invention.

More specifically, and referring to FIGS. 1, 5 and 6, the process for establishing a predefined data path involves identifying a network device 24 that will serve as the sending node 44 and another network device that will serve as the receiving node 46. Then, the network devices 24 for defining the path from the sending node 44 to receiving node 46 are identified (block 48). Typically, the network devices 24 between the sending node 44 and the receiving node 46 will be routers.

Once the sending and receiving nodes 44, 46 and the intermediate network devices 24 defining the path have been identified, the processor 14 of the test controller 10 starts the traffic flowing from the receiving node 46 to make its presence known to the network 12 (block 50). The sending node 44 is subsequently started (block 52). Starting the receiving node 46 first eliminates the chance that a sent data packet will not be received because the receiving node is not ready or is unknown to the network 12.

Once the sending node 44 has been started, the configuration of the network devices 24 that have been identified between the sending node 44 and the receiving node 46 are modified so that these devices are enabled to direct or route data through the predefined path (block 54). Modifying the routing configuration of the intermediate network devices 24 between the sending node 44 and the receiving node 46 injects change into the network instructions on how to pass data from the sending node 44 to the receiving node 44. The time taken for the modified information or instructions to propagate through the intermediate network devices 24 between the sending node 44 and the receiving node 46 is measured by the counter 20 (block 56) and stored in the memory 16 (block 58). Also, the time that it takes for a data packet to be transmitted from the sending node 44 to the receiving node 46 is also measured by the counter 20 (block 56) and stored in the memory 16 (block 58). Then, the original configuration of the network devices 24 in the path between the sending and receiving nodes 44, 46 is restored (block 60), and the process described above may be repeated to obtain a number of time measurements for better understanding of the system.

Figure 7:
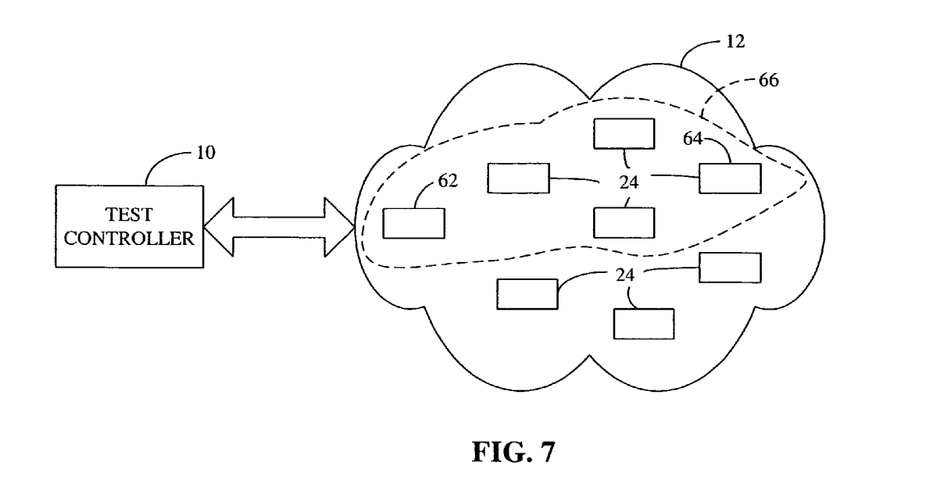
FIG. 7 is a diagram illustrating a system of a network modified to analyze an Internet group protocol management (IGMP) group propagation delay; and, FIG. 8 is a flowchart describing the process for performing the Internet group protocol management (IGMP) group propagation delay analysis in accordance with one embodiment of the present invention.
Figure 8:
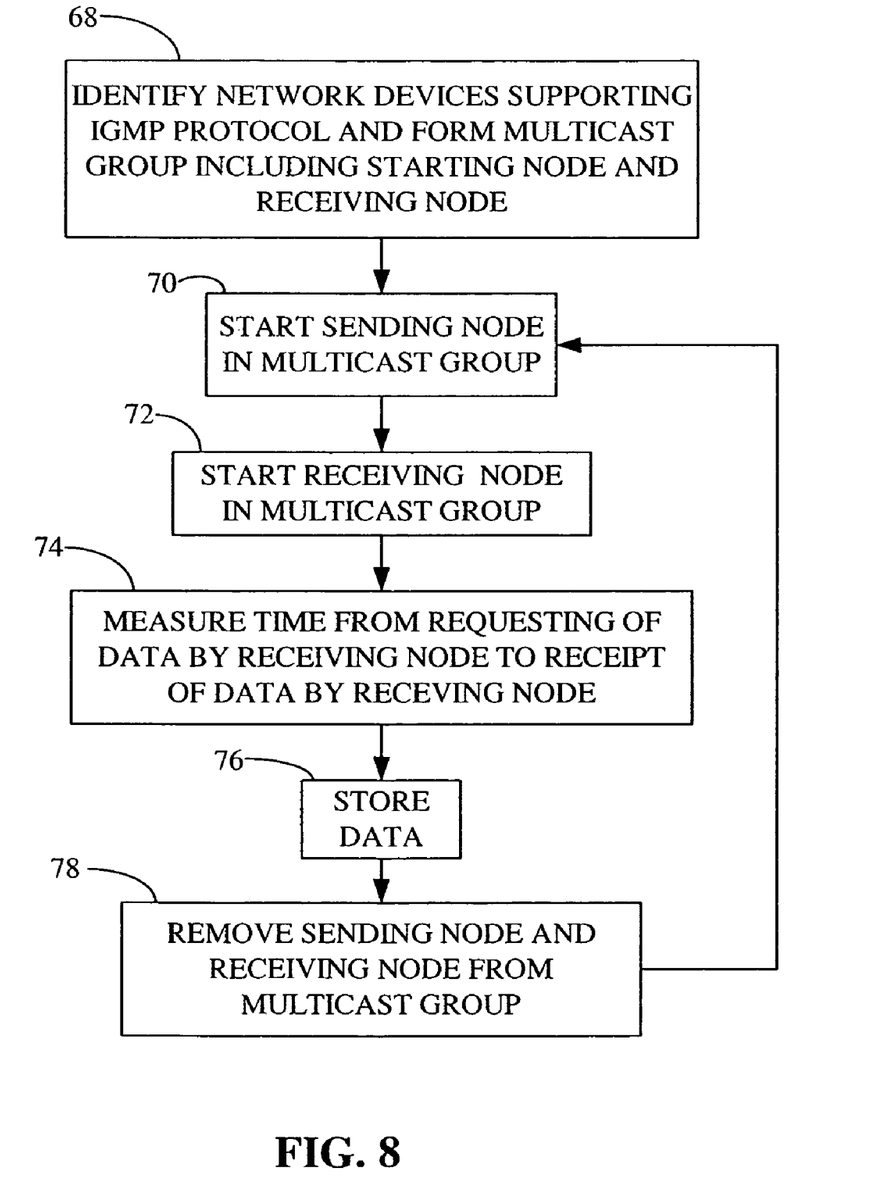

Referring to FIGS. 1, 7 and 8, another test in accordance with the present invention relates to the measurement of a data packet delay in an Internet group management protocol (IGMP) group. An IGMP is a protocol used for establishing host memberships in particular multicast groups in a single network. The mechanisms of the protocol allow a host to inform its local router that it wants to receive messages addressed to a specific multicast group. In other words, the IGMP helps the network devices 24 such as switches in the network 12 identify where data packets should be delivered. The IGMP also tells the switches when to stop delivering the data packets when they are no longer desired.

In this test, the network devices 24 that support IGMP protocol are identified, and a multicast group 66 including a sending node 62 and a receiving node 64 is formed from among the identified network devices. This is accomplished by issuing a command from the processor 14 of the test controller 10 using the IGMP protocol (block 68). Then, the sending node 62 is instructed to start sending data to the devices 24 in the multicast group 66 (block 70), and the receiving node 64 of the multicast group 66 is started, requesting to receive data from the multicast group 66 (block 72). In other words, the sending node 62 sends data in the form of multicast packets with sequence numbers, and the receiving node 64 sends its request to join the multicast group 66 to a reserved multicast address (pre-defined by the protocol) which the intervening network devices 24 interpret and act upon. Once all network devices 24 in the path between the receiving node 64 and the sending node 62 have been notified, the multicast packets begin to flow.

The time the receiving node 64 requests receipt of the multicast data from the multicast group 66 to the time the data is actually delivered to the receiving node 64 is measured (block 74), and stored in the controller memory 16 (block 76). The sending node 62 and the receiving node 64 may then leave the multicast group 66 (block 78), and later rejoin the multicast group 66 as described above, so that another measurement may be made at a different time (block 70).

It should be understood that the data or result obtained from the above-described tests show the analyst deviations in performance from historical patterns. There may be significant variation in the results of the testing of one network relative to another. However, the same network should provide consistent results (provided each iteration of the test is executed in the same environment, i.e., same time of day, same day of week, so that network data patterns are similar with the same software running on network devices 24 as previous tests). The value of this data is of interest when changes are made to the network 12 (e.g., when device software is upgraded, topologies are changed, new vendor equipment is introduced into the network, configuration changes). The user can compare "pre change" data with "post change" data to determine whether performance was impacted either positively or negatively. For the spanning tree analysis described above, this means that the time to converge and/or the number of iterations to new topology should remain consistent (assuming no configuration changes and network characteristics such as utilization).

For the test involving establishment of a predefined path through network devices 24, from the time the routing protocols introduce change into the topology until the time the topology reflects that change can be measured by using the initiation of the change as a start marker and the update to the network device connected to the destination node as the end marker. An equally valuable metric is to transmit packets at regular intervals that include sequence numbers and to record the sequence number of the first received packet. For the test involving an IGMP group, there are two possible measurements: time delay between the initiation of the request and use of the sequence numbers to count packet loss.

In general, the absolute value of each of the measurements resulting from the above-described test has limited value. These results are subject to interpretation and require thorough understanding of the whole system by the analyst.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for analyzing a system having a spanning tree with a root device and a plurality of network devices associated with the root device and wherein the system is under test in a network, the method comprising:
   issuing instructions from a user to modify a path configuration of the spanning tree to include at least one select network device identified by the user as a new root device for purposes of analyzing the system;
   issuing a command to the system to perform a predefined test program in the modified configuration;
   collecting data resulting from performing the test program in the modified configuration of the system;
   analyzing the system using the data collected; and
   restoring the spanning tree to the configuration prior to being modified.

2. The method as defined in claim 1 wherein
   the command is issued through a spanning tree protocol to reconfigure the spanning tree based on the new root device.

3. The method as defined in claim 2, wherein the data collected is a measurement of time for the system to stabilize to the reconfigured spanning tree, or a number of iterations of calculations required to reconfigure the spanning tree based on the new root device.

4. The method as defined in claim 1, wherein said instruction issued modifies the configuration of the system to define a data path having a plurality of network devices including the select network device for routing data through the path of the system, and the command is issued to send data from a starting node to a receiving node of the defined path.

5. The method as defined in claim 4, further comprising enabling the receiving node to start receiving data prior to enabling the starting node to start sending data.

6. The method as defined in claim 5, wherein the data collected is a measurement of time for data to travel from the starting node to the receiving node.

7. The method as defined in claim 1, wherein the configuration of the system is modified to establish a multicast group having a plurality of network devices including the select network device that support an Internet group management protocol (IGMP) including a sending node and a receiving node.

8. The method as defined in claim 7, wherein the command is issued to send multicast data to the receiving node via the multicast group.

9. The method as defined in claim 8 wherein the collected data is an elapsed period from a time the receiving node requests receipt of multicast data to a time the multicast data is received by the receiving node.

10. The method as defined in claim 1 further comprising:
    restoring the system to the configuration prior to being modified; and
    repeating the steps of issuing instructions, issuing commands, collecting data and restoring the system to further analyze the system under test.

11. The method as defined in claim 1 further comprising determining a health of the system based on an analysis of the collected data.

12. Apparatus for analyzing a system having a spanning tree with a root device and a plurality of network devices associated with the root device and wherein the system is under test in a network, the apparatus comprising:
    a processor, in communication with the system, for issuing instructions from a user to modify a path configuration of the spanning tree based on at least one select network device identified by the user as a new root device for purposes of analyzing the system, and issuing a command to the system to perform a predefined test program in the modified configuration;
    a memory for storing data resulting from performing the test program in the modified configuration to analyze the system; and
    wherein the user analyzes the system using the data stored in the memory, and said processor restores the system to the configuration prior to being modified.

13. The apparatus as defined in claim 12, the command to reconfigure the spanning tree based on the new root device uses a spanning tree protocol.

14. The apparatus as defined in claim 13, wherein the stored data is a measurement of time for the system to stabilize to the reconfigured spanning tree, or a number of iteration of calculations required to reconfigure the spanning tree based on the new root device.

15. The apparatus as defined in claim 12, wherein said processor issues the instructions to modify the configuration of the system to defined a data path having a plurality of network devices including the select network device for routing data through the defined path of the system, and issues the command to send data from a starting node to a receiving node of the defined path.

16. The apparatus as defined in claim 15, wherein said processor enables the receiving node to start receiving data prior to enabling the starting node to start sending data.

17. The apparatus as defined in claim 16, wherein the stored data is a measurement of time for data to travel from the starting node to the receiving node.

18. The apparatus as defined in claim 12, wherein said processor issues instructions to modify the configuration of the system to establish a multicast group having a plurality of network devices including the select network device that support an Internet group management protocol (IGMP) including a sending node and a receiving node.

19. The apparatus as defined in claim 18, wherein said processor issues the command to send multicast data to the receiving node via the multicast group.

20. The apparatus as defined in claim 19, wherein the stored data is an elapsed period from a time the receiving node requests receipt of multicast data to a time the multicast data is received by the receiving node.

21. The apparatus as defined in claim 12, wherein said processor issues instruction to restore the system to the configuration prior to being modified.

22. The apparatus as defined in claim 12, wherein said data stored in the memory is analyzed to determine a health of the system.

* * * * *

UNITED STATES PATENT AND TRADEMARK OFFICE
CERTIFICATE OF CORRECTION

PATENT NO.         : 7,768,932 B2
APPLICATION NO.    : 11/105042
DATED              : August 3, 2010
INVENTOR(S)        : Vince Mendoza et al.

Page 1 of 1

It is certified that error appears in the above-identified patent and that said Letters Patent is hereby corrected as shown below:

In column 5, lines 65-66, in Claim 10, below "comprising:" delete "restoring the system to the configuration prior to being modified; and".

In column 6, line 24, in Claim 13, before "the" insert -- wherein --.

In column 6, line 35, in Claim 15, delete "defined" and insert -- define --, therefor.

Signed and Sealed this
Eighth Day of November, 2011

David J. Kappos
*Director of the United States Patent and Trademark Office*